United States Patent [19]

Hoyler

[11] 3,988,891

[45] Nov. 2, 1976

[54] POSITIONING ARRANGEMENT HAVING A DRIVE MOTOR

[75] Inventor: Alfred Hoyler, Buhlertal, Germany

[73] Assignee: Robert Bosch G.m.b.H., Stuttgart, Germany

[22] Filed: Nov. 11, 1974

[21] Appl. No.: 522,943

[30] Foreign Application Priority Data
Nov. 16, 1973 Germany.............................. 2357241

[52] U.S. Cl.............................. 60/288; 23/288 FA; 64/15 C; 64/27 C; 251/81
[51] Int. Cl.$^2$...................... F01N 3/15; F16D 3/14; F16K 31/44
[58] Field of Search ................... 60/288; 23/288 FA; 74/411; 64/27 C, 15 C; 251/80, 81

[56] References Cited
UNITED STATES PATENTS

| | | | |
|---|---|---|---|
| 1,975,907 | 10/1934 | Strauss................................. | 64/27 C |
| 2,056,902 | 10/1936 | Longenecker......................... | 251/80 |
| 2,761,331 | 9/1956 | Buescher............................... | 251/81 |
| 3,208,298 | 9/1965 | Pickles.................................. | 64/27 C |
| 3,805,521 | 4/1974 | Dafler................................... | 60/288 |

*Primary Examiner*—Douglas Hart
*Attorney, Agent, or Firm*—Michael J. Striker

[57] ABSTRACT

A controlled member is movable between two end positions defined by respective first and second stops, particularly a flap-type valve member located in the exhaust gas conduit of an internal combustion engine movable between first and second end positions in which the valve member comes into abutment with respective first and second seating surfaces of the conduit. An arrangement for positioning the controlled member includes a drive motor having a motor shaft, a worm screw connected to and driven by the motor shaft, a worm gear meshing with and driven by the worm screw, a positioning-arrangement output shaft coupled to and driving the controlled member, a claw coupling having a first part coupled to and driving the output shaft and a second part coupled to and driven by the worm gear, a unit automatically operative for turning off the drive motor when the controlled member is moved into one of the end positions thereof, and a damping spring arrangement intermediate the two parts of the claw coupling and operative upon drive motor turn-off for absorbing the kinetic energy present in the moving parts of the positioning arrangement to effect braking of such moving parts and so dimensioned as not to be deformed during such absorbing beyond a predetermined maximum permissible extent.

9 Claims, 6 Drawing Figures

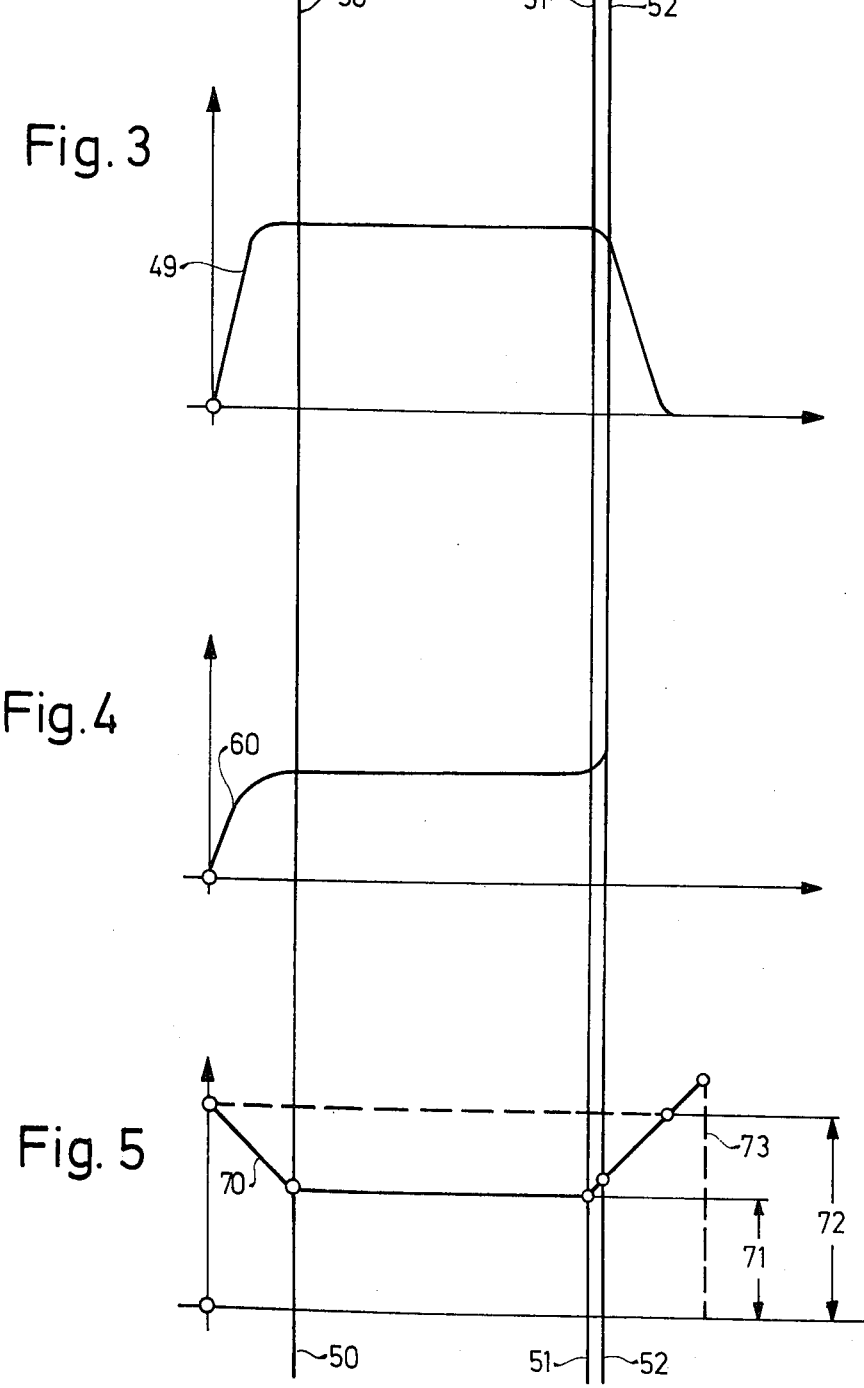

POSITIONING ARRANGEMENT HAVING A DRIVE MOTOR

BACKGROUND OF THE INVENTION

The invention relates to a positioning arrangement comprised of a drive motor and a worm gear transmission, with the output shaft of the positioning arrangement perferably being operative for moving an exhaust gas control valve between its two positions in the exhause conduit of an internal combustion engine. The valve member, usually of the flap type, when reaching either one of its two end positions, is pressed against seating surfaces in the wall of the conduit, causing the drive motor of the positioning arrangement to be turned off. The positioning arrangement may include a driving shaft provided with one half of a claw coupling cooperating with a second half of the claw coupling, with damping means being provided intermediate the two cooperating parts of the coupling.

A known positioning arrangement of this type makes use of the fact that, when the exhaust gas valve member is moved into one of its two end positions and begins to be pressed against the respective valve seating surface, the current drawn by the drive motor of the positioning arrangement rises. This current rise is used as an indication that the valve member has reached the end position, and is utilized to effect turning off of the drive motor. However, in order that the valve member, after being moved into one of its two end positions, not be pressed hard against the respective seating surface, there are provided intermediate the facing sides of the coupling claws damping means in the form of blocks of elastic synthetic plastic material which becomes somewhat deformed, before the current drawn by the drive motor reaches the value which effects motor turn-off. Additionally, these damping means are intended to absorb the kinetic energy possessed by the moving parts of the positioning arrangement at the time the drive motor of the positioning arrangement is turned off. This is to prevent jamming of the worm gear transmission as a result of the forces exerted upon the inclined flanks of the worm gear screw threads and to prevent the possibility of buckling of the worm gear. Furthermore, the elastically deformed damping blocks are intended to supplement motor start-up when the motor is again turned on. This latter action is particularly of importance if the flap-type valve member remains in one of its two end positions for a prolonged period of time and becomes stuck in such position due to baking-on of exhaust gas particles. All these requirements are met by the synthetic plastic damping blocks of the known positioning arrangement, although a limit is placed upon the elasticity which the damping blocks may have, due to the requirement that they be sufficiently rigid during the movement of the valve from one position to another to assure a firm and sturdy transmission of force to the valve member. However, experience has shown that the volume constancy of the elastically deformed damping blocks presents certain practical problems, because the relatively small compression of the blocks in one direction produces a considerable expansion of the block in the transverse direction, so as to preclude a smooth absorption by the elastic material of the kinetic energy remaining in the positioning arrangement after motor turn-off. In order to avoid damage to the arrangement, the chambers which contain the damping blocks must accordingly be made considerably larger than the blocks themselves, and this requirement leads in practice to a variety of problems of design and construction.

SUMMARY OF THE INVENTION

It is a general object of the invention to improve upon positioning arrangements of the general type discussed above, and to provide a construction which is easily built, of compact construction, which is easy to assemble, which employs damping means which can be produced in an economical manner and which have an elasticity which is readily adjustable to the requirements of a particular application.

These objects, and others which will become more understandable from the description, below, of a preferred embodiment, can be met, according to one advantageous concept of the invention, by using for the damping means at least one spring which absorbs the kinetic energy present in the positioning arrangement at the time of motor turn-off but without becoming strained beyond the maximum extent permissible for the spring. With regard to the dimensions of the spring, there is no problem of volume constancy comparable to that present in the prior-art construction, and accordingly, the chambers which house the springs need not be significantly larger than the springs themselves. Furthermore, the springs can be manufactured in a simple and economical manner, can exhibit characteristics which very precisely correspond to those selected in advance, and can be readily adjusted to the requirements of particular uses, so that the forces exerted by the springs will have just the desired values.

Advantageously, the second half of the claw coupling is integrated in the worm gear. Also advantageously, a coupling claw connected with the output shaft of the positioning arrangement has associated with it, on opposite sides, respective damping springs which are supported upon respective shoulder surfaces of the worm gear, so that the inventive damping means come into operation in both directions of rotation of the worm gear.

A particularly compact construction for the positioning arrangement results when the springs are disposed in a groove recessed into the surface of one axial side of the worm gear, with a coupling claw of the output shaft of the positioning arrangement projecting into such groove.

According to a further advantageous concept of the invention, the aforementioned groove extends circumferentially in the axial end face of the worm gear, and the damping springs lying in such groove are helical springs. In this way, the springs can without disadvantage be made particularly long, this being advantageous with respect to their elasticity and with respect to the possible course of travel of the springs.

In order to prevent the springs from falling out of their respective groove sections, it has proven advantageous to secure to the output shaft of the positioning arrangement a plate which covers over substantial portions of the circumferentially extending groove sections, with such plate carrying the coupling claw which is connected with the output shaft of the positioning arrangement, and with this claw itself preferably being formed by bending a portion of such plate to form a nose.

According to a further concept of the invention, the aforementioned coupling claw projects into and engages a recess in a ball member, preferably made of synthetic plastic material. The ball member is located in the aforementioned groove and supports those ends of the helical springs opposite to the ends which are supported on shoulder surfaces of the worm gear. Supporting these opposite ends of the two springs upon the spherical surface of the ball member assures that the helical springs, constrained by the circumferential extension of the groove to assume a curved shape, are properly and reliably supported at their opposite ends. The ball member with its receiving recess can be formed very simply by injection molding.

Advantageously, the helical springs are arranged between the respective shoulder faces on the worm gear and the aforementioned ball member with a certain amount of pre-compression. The requirements of particular uses can readily be met by making the extent of the pre-compression adjustable.

This adjustability can be realized quite simply by providing, at that end of at least one of the two springs which faces away from the ball member, an adjusting screw which can be screwed into the body of the worm gear. The adjusting screw has a conical head portion which provides support for the respective end of the respective one of the two helical springs. Turning of the adjusting screw causes the spring end to be displaced to different extents transversely relative to the rotation axis of the adjusting screw.

In order that the adjusting screw be easily and precisely adjustable, it is advantageous to provide, between the conical section of the adjusting screw and the associated spring end, an intermediate member. The intermediate member, at the side thereof facing the conical surface portion of the adjusting screw, has a generally complementary configuration to facilitate turning of the adjusting screw and to facilitate the conversion of the axial displacement of the adjusting screw into a transverse displacement of the associated spring end.

Advantageously, the aforementioned plate is provided with an access cutout in the region of the adjusting screw, so that adjustment of the pre-compression of the springs can be readily effected, even when the positioning arrangement is in fully assembled condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a graph depicting the speed of the output shaft of the drive motor which transmits force through the claw coupling;

FIG. 4 is a graph depicting the current drawn by such drive motor during the movement of the controlled member, for example a valve member, from a first to a second end position;

FIG. 5 is a graph depicting the spring force developed during the movement of the controlled member.

DESCRIPTION OF THE PREFERRED EMBODIMENTS

Figure 1:
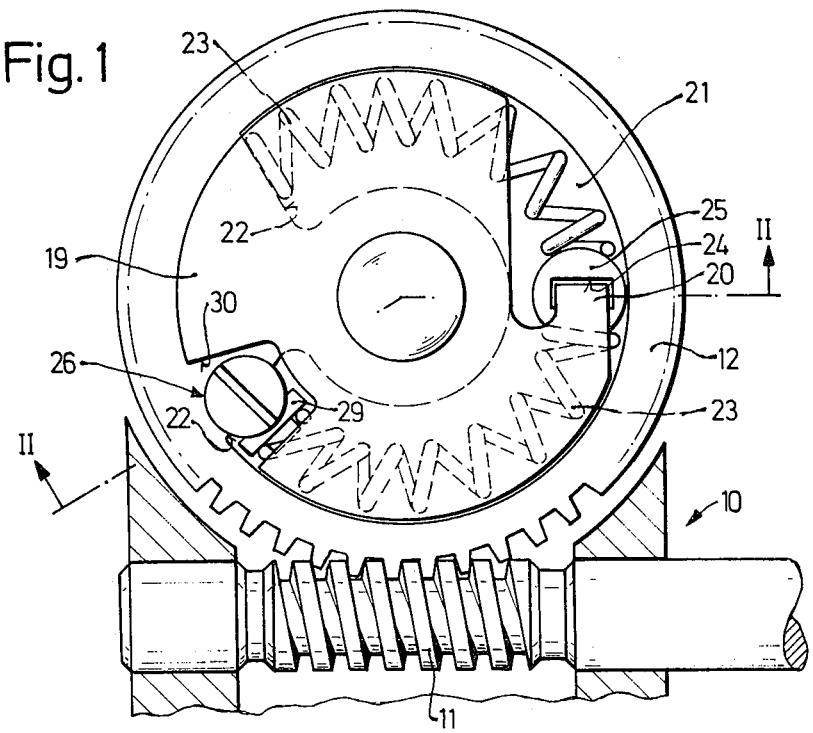
FIG. 1 is a top view of the claw coupling provided in the worm transmission.
Figure 2:
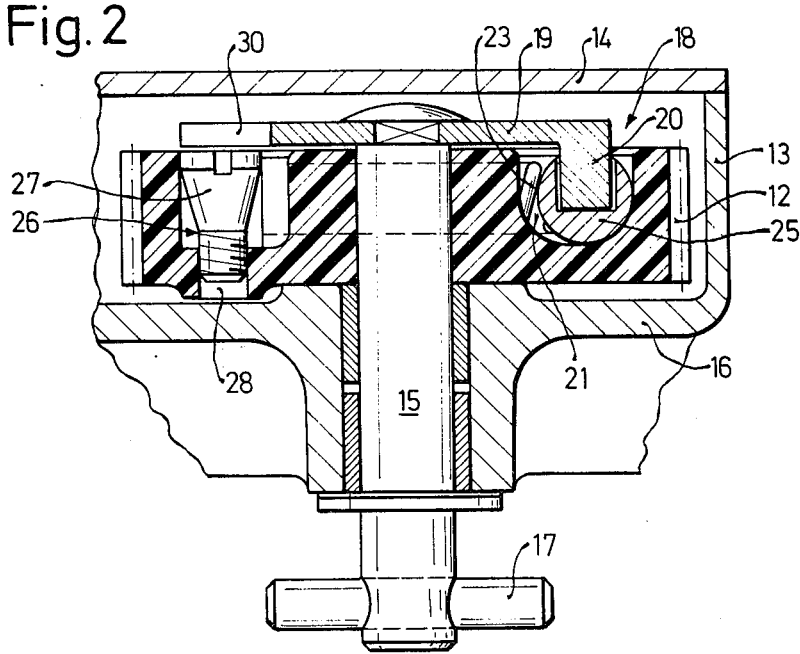
FIG. 2 is a section taken along line II—II of FIG. 1, additionally showing the housing for the worm transmission.

FIGS. 1 and 2 depict part of a positioning arrangement for positioning the flap-type valve member in the exhaust conduit of an internal combustion engine. In particular, FIGS. 1 and 2 depict a worm transmission 10. The transmission 10 is comprised of a worm screw 11 coupled to and driven by the output shaft of the drive motor to the positioning arrangement. A worm gear 12 meshes with and is driven by the worm screw 11. The worm transmission 10 is located in a housing 13 (see FIG. 2) closed by a cover member 14. The worm gear 12 is mounted on, and is rotatable relative to, a rotatable shaft 15. The shaft 15 constitutes the output shaft of the positioning arrangement and is journalled in a wall 16 of the transmission housing 13, one end of the shaft 15 projecting out of the housing 13. This projecting end of the shaft 15 is provided with a linkage member 17 which serves to establish a rigid and secure connection between the output shaft 15 of the positioning arrangement and the controlled member, i.e., the flap-type exhaust-gas-conduit valve member.

In order that the rotary motion of the worm gear 12 be transmitted to the output shaft 15 of the positioning arrangement, there is arranged between the parts 12 and 15 a claw coupling 18. One half of the claw coupling 18 is connected, by means of a plate 19, to the output shaft 15 nonrotatable relative to shaft 15, i.e., for rotation with the shaft 15. The other half of the claw coupling 18 is constituted by the worm gear 12 itself.

In order to achieve the form-locking connection between the two coupling halves which is conventional with claw couplings, there is formed on the plate 19 a nose 20 directed towards the worm gear 12, with the nose 20 projecting into an open groove 21 provided in the surface of the axial end face of the worm gear 12. The groove 21 curves along the circumferential direction of the worm gear 12 and encloses an angle of about 300°. The end surfaces 22 of the groove 21 are so configurated as to serve as end supports for the helical compression springs 23 provided in the groove 21 to serve as damping means. The nose 20 of the plate 19 projects into a recess 24 in a ball member 25 made of synthetic plastic material, so that the ends of the compression springs which face towards the nose or coupling claw 20 can derive support from the claw 20 in a reliable and sturdy manner. Thus, the cooperating claws of the claw coupling 18 are constituted, on the one hand, by the coupling claw 18 or alternatively expressed by the ball member 25 connected thereto and, on the other hand, by the two end faces 22 of the groove 21, with the pre-compressed compression springs 23 disposed in the groove 21 constituting damping means. In order that the compression springs 23 be prevented from falling out of the groove 21, the plate 19 is made large enough to close off substantial portions of the curving groove 21.

The adjust the pre-compression of the compression springs 23, there is provided in one of the two end regions of the groove 21 an adjusting screw 26 having a conical head portion 27. The conical surface of the head portion 27 cooperates with that end of the respective spring which faces away from the ball member 25 in such a manner that, when the adjusting screw 26 is screwed deeper into the associated threaded bore 28 provided in the body of the worm gear 12, the pre-compression of the two compression springs 23 increases. In order that the turning movement of the adjusting screw not be directly transmitted to the associated end of the respective compression screw 23, and thereby produce undesirably high friction forces, there is provided between the conical surface of the head portion 27 and the associated end of the respective spring 23 an intermediate member 29. The side of the intermediate member 29 which faces towards the adjusting screw 26 is provided with a concave surface portion more or less complementary to the conical surface of the screw head portion 27. In order to assure that the adjusting screw 26 is readily accessible, even when the positioning arrangement is fully assembled, the plate 19 is provided in the region of the adjusting screw with an access cutout 30.

The transmission of force from the worm screw 11 to the linkage member 17 proceeds through the intermediary of the worm gear 12, then depending upon the rotation direction of worm gear 12 from one of the two end surfaces 22 through the respective compression spring 23 to the ball member 25, and from the ball member 25 to the nose or claw 20. As mentioned above, the plate 19 provided with claw 20 is connected to the output shaft 15, non-rotatable relative to the shaft 15.

Figure 6:
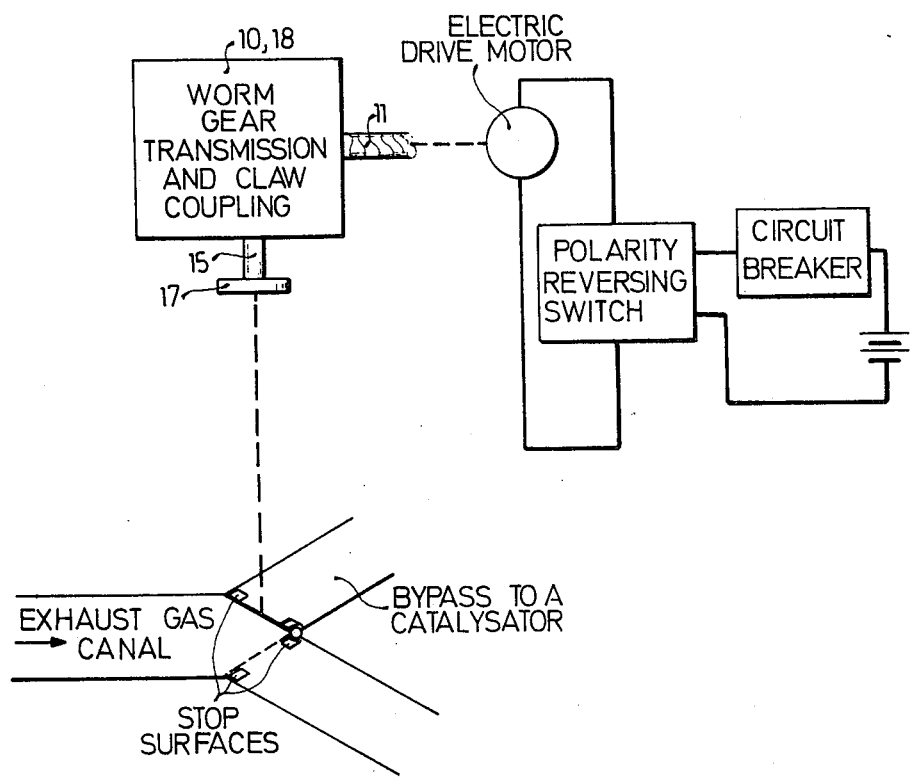
FIG. 6 depicts schematically the entire positioning arrangement and the controlled member which is to be positioned.

FIG. 6 schematically depicts the overall positioning arrangement and the controlled member positioned thereby. The controlled member, in this exemplary illustration, is a flap-type valve member located in the exhaust conduit of an internal combustion engine. The valve member is pivotable between two end positions defined by respective stop surfaces. The valve member is mechanically coupled to the output member 17 secured on positioning-arrangement output shaft 15. The worm screw 11 of the worm gear transmission 10 and claw coupling 18 is driven by the output shaft of an electric drive motor. The electric drive motor is energized by a battery. The direction of rotation of the motor output shaft is controlled by a conventional polarity reversing switch connected between the motor and the battery. Connected in circuit with the motor and battery is a conventional circuit breaker device. When the current drawn by the motor exceeds a predetermined value, the circuit breaker is tripped and the motor current path opened. The moving switch member(s) of the polarity reversing switch and the moving member(s) of the circuit breaker are mechanically coupled, so that when the polarity reversing switch is switched over, the circuit breaker becomes reset automatically. The activation of the polarity reversing switch can in principle be manual or else performed by an automatic control device.

FIGS. 3–5 depict graphically what occurs during the performance of a positioning operation. In FIGS. 3–5, time is plotted along the horizontal axis, and the time scales of the three graphs are the same.

FIG. 3 depicts the variation of the rotary speed of the output shaft of the electric drive motor which drives the worm screw 11 during the performance of one positioning operation.

FIG. 4 depicts the variation in the current drawn by the electric drive motor during the positioning operation.

FIG. 5 depicts the variation of compression force in the compression springs during the performance of the positioning operation.

In FIGS. 3–5, it is assumed that the exhaust-gas flap valve member is initially in one end position and is to be moved into the other end position. When the electric drive motor is turned on, the rotary speed of the drive motor output shaft rises quickly from zero, achieving its maximum value before the time indicated on line 50, i.e., before the valve member begins to be moved.

In FIGS. 3–5, line 51 indicates the time at which the valve member reaches its second end position and abuts against the respective stop surface. After this moment, the output torque of the electric motor is opposed by one of the two springs 23, as a result of which the motor-output-shaft speed becomes somewhat lower. At the time indicated by line 52, the drive motor is automatically turned off. However, the rotary components of the electric drive motor continue to turn, due to inertia, but only for a short time because of the opposing force exerted by the respective one of the two springs 23.

The current drawn by the electric drive motor during the performance of the positioning operation is indicated by graph line 60 in FIG. 4. It will be noted that, in the event that the controlled member (flap-type exhaust conduit valve member) is stuck in the first end position, for example due to baking on of exhaust gas particles the ripping free of the stuck controlled member will not require an increased draw of current by the electric drive motor. This is because one of the two compression springs 23 supplements the start-up operation of the drive motor. The motor current does not increase sharply until after the valve member has been moved to its second end position and abuts against the respective stop surface; this is because further turning of the output shaft of the drive motor is strongly and increasingly opposed by the two compression springs 23. At the time indicated by line 52 in FIGS. 3–5, the motor current rises to a value which automatically triggers motor deenergization. Accordingly, the motor current falls suddenly back to zero.

From FIG. 5 it can be seen that the stressing of the fully loaded one of compression springs 23 goes back to the magnitude of the pre-compression stress. As the line 70 indicates, this occurs when the controlled member, at the time designated by line 50, is set into motion. Between the times corresponding to lines 60 and 51, the stress in the springs is equal to the pre-compression stress 71. From the moment the valve member reaches the second end position and abuts against the respective stop surface (designated by line 51) the spring stress increases in proportion to further movement, until such further movement is braked to a halt and the spring stress reaches the valve 72.

It is important for the dimensioning of the compression springs 23 that, upon drive motor turn-off, the kinetic energy retained in the moving parts of the positioning arrangement be absorbed by the springs 23 before the springs reach their maximum permissible loading. This would occur in the spring stress curve of FIG. 5 if the spring under load were compressed to its solid (fully compressed) length, which would occur if the load rose to the value 73.

It will be understood that each of the elements described above, or two or more together, may also find a useful application in other types of circuits and constructions differing from the type described above.

While the invention has been illustrated and described as embodied in an arrangement for positioning a valve member in an engine exhaust conduit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In combination with a controlled member movable between two end positions defined by restrictive first and second stops, particularly a flap-type valve member loccated in the exhaust-gas conduit of an internal combustion engine and movable between first and second end positions in which the valve member comes into abutment with respective first and second seating surfaces of the conduit, an arrangement for positioning said controlled member comprising:
   a. a driven motor having a motor shaft, a worm screw connected to and driven by said motor shaft, a worm gear meshing with, and driven by, said worm screw and provided on one axial end face thereof with a groove extending circumferentially relative to its rotation axis;
   b. a positioning arrangement output shaft coupled to and driving said controlled member, a claw coupling having a first part coupled to and driving said output shaft and a second part coupled to and driven by said worm gear;
   c. means automatically operative for turning off said drive motor when said controlled member is moved into one of said end positions;
   d. a pair of oppositely acting damping helical springs disposed in said groove under pre-compression intermediate said two parts of said claw coupling, each of said springs being arranged on one of the opposite sides of at least one claw of said first part of said claw coupling and being supported by respective shoulder surfaces provided on said worm gear, both of said springs being operative upon drive-motor turn-off for absorbing the kinetic energy present in the moving parts of the positioning arrangement to effect braking of such moving parts and so dimensioned as not to be deformed during such absorbing beyond a predetermined maximum possible extent; and
   e. an adjusting screw having a conical head, said screw being threaded into the body of said worm gear for screw threaded shifting in the axial direction and so disposed that said conical head portion cooperates with one end of one of said springs in such a manner that axial displacement of said adjusting screw results in a transverse displacement of said springs effecting a variation in the pre-compression of said springs.

2. The combination as defined in claim 1, including a plate member carrying said at least one claw and fixedly connected to said positioning arrangement output shaft, and so configurated as to cover off a substantial portion of said surface groove, thus preventing said helical springs from falling out of said groove.

3. The combination defined in claim 1, wherein said at least one claw is an integral portion of said plate member.

4. The combination defined in claim 1, and further including an intermediate member between said conical head portion of said adjusting screw and the cooperating end of the respective one of said springs.

5. The combination defined in claim 4, wherein said intermediate member on the side thereof facing said conical head portion has a surface configuration substantially complementary to that of said conical head portion.

6. In combination with a controlled member movable between two end positions defined by restrictive first and second stops, particularly a flap-type valve member located in the exhaust-gas conduit of an internal combustion engine and movable between first and second end positions in which the valve member comes into abutment with respective first and second seating surfaces of the conduit, an arrangement for positioning said controlled member comprising:
   a. a driven motor having a motor shaft, a worm screw connected to and driven by said motor shaft, a worm gear meshing with, and driven by, said worm screw and provided on one axial end face thereof with a groove extending circumferentially relative to its rotation axis;
   b. a positioning arrangement output shaft coupled to and driving said controlled member, a claw coupling having a first part coupled to and driving said output shaft and a second part coupled to and driven by said worm gear;
   c. means automatically operative for turning off said drive motor when said controlled member is moved into one of said end positions;
   d. a pair of oppositely acting damping helical springs disposed in said groove under pre-compression intermediate said two parts of said claw coupling, each of said springs being arranged on one of the opposite sides of at least one claw of said first part of said claw coupling and being supported by respective shoulder surfaces provided on said worm gear, both of said springs being operative upon drive-motor turn-off for absorbing the kinetic energy present in the moving parts of the positioning arrangement to effect braking of such moving parts, and so dimensioned as not to be deformed during such absorbing beyond a predetermined maximum possible extent; and
   e. a ball member in said groove, said ball member having a recess in which is received said at least one claw of said claw coupling, each of said helical springs having one end supported by a respective one of said shoulder surfaces of said worm gear and having the other end supported on a portion of said ball member.

7. The combination as defined in claim 6, including an adjusting screw having a conical head portion, said screw being threaded into the body of said worm gear for screwthreaded shifting in the axial direction, and so disposed that said conical head portion cooperates with one end of said one of said springs in such a manner that axial displacement of said adjusting screw results in a transverse displacement of said springs effecting variation of the pre-compression of said springs.

8. The combination defined in claim 6, wherein said second part of said claw coupling is integrated with said worm gear.

9. The combination defined in claim 6, wherein said oppositely acting helical springs are so dimensioned as to absorb all the energy possessed by the moving parts of the positioning arrangement at the time of motor turn-off without being compressed all the way to the fully compressed solid length.

* * * * *